(12) United States Patent
Hoogenberg

(10) Patent No.: US 10,436,295 B2
(45) Date of Patent: Oct. 8, 2019

(54) CONTINUOUS VARIABLE TRANSMISSION

(71) Applicant: HOOGENBERG POWERTRAIN INNOVATIONS B.V., Rijssen (NL)

(72) Inventor: Heerke Hoogenberg, Rijssen (NL)

(73) Assignee: HOOGENBERG POWERTRAIN INNOVATIONS B.V., Rijssen (NL)

( * ) Notice: Subject to any disclaimer, the term of this patent is extended or adjusted under 35 U.S.C. 154(b) by 0 days.

(21) Appl. No.: 15/750,354

(22) PCT Filed: Jul. 29, 2016

(86) PCT No.: PCT/NL2016/050564
§ 371 (c)(1),
(2) Date: Feb. 5, 2018

(87) PCT Pub. No.: WO2017/023170
PCT Pub. Date: Feb. 9, 2017

(65) Prior Publication Data
US 2018/0195587 A1    Jul. 12, 2018

(30) Foreign Application Priority Data
Aug. 5, 2015   (NL) ..................................... 2015274

(51) Int. Cl.
*F16H 15/52*   (2006.01)
*F16H 15/54*   (2006.01)
*F16H 15/38*   (2006.01)

(52) U.S. Cl.
CPC .............. *F16H 15/52* (2013.01); *F16H 15/54* (2013.01); *F16H 2015/383* (2013.01)

(58) Field of Classification Search
CPC .......... F16H 15/48; F16H 15/52; F16H 15/54; F16H 9/04; F16H 9/10; F16C 11/06;
(Continued)

(56) References Cited

U.S. PATENT DOCUMENTS

2014/0235396 A1* 8/2014 Dupont ................... F16H 29/04
475/190

FOREIGN PATENT DOCUMENTS

| JP | 2009243603 A | * 10/2009 | ............. F16H 13/04 |
| WO | 03/078867 A1 | 9/2003 | |

(Continued)

OTHER PUBLICATIONS

English Translation of JP2009243603 A (Year: 2009).*
International Search Report, dated Dec. 20, 2016, from corresponding PCT/NL2016/050564 application.

*Primary Examiner* — Jeffrey A Shapiro
(74) *Attorney, Agent, or Firm* — Young & Thompson

(57) ABSTRACT

A continuously variable transmission includes an input shaft and a shaft journal eccentrically connected thereto on which a transmission element is bearing supported, as well as an output shaft which is connected to the transmission element via a constant velocity joint. The transmission further includes a housing and a pulley accommodated in it having two axially displaceable pulley wheels spaced apart from each other and which are fixed in the housing in the direction of rotation, as well as an adjusting mechanism for varying the space between the two pulley wheels. The transmission element is located between the two pulley wheels and is formed by a ring that rolls down in the pulley on rotation of the input shaft.

20 Claims, 4 Drawing Sheets

(58) Field of Classification Search
CPC ... F16C 11/0619; F16C 11/0685; F16C 11/08; Y10T 403/32672
See application file for complete search history.

(56) References Cited

FOREIGN PATENT DOCUMENTS

| WO | WO 003078867 A1 * | 9/2003 | ............. F16H 15/22 |
| WO | 2009/128723 A1 | 10/2009 | |

* cited by examiner

CONTINUOUS VARIABLE TRANSMISSION

FIELD OF THE INVENTION

The invention relates to a continuously variable transmission comprising:
- a housing,
- an input shaft bearing supported in the housing,
- an output shaft bearing supported in the housing,
- a pulley with two pulley wheels spaced apart from each other and provided with contact surfaces running obliquely relative to the central axis and facing each other, of which pulley wheels at least one pulley wheel can be displaced in axial direction relative to the other pulley wheel,
- an adjusting mechanism for varying the travel radius of the push belt, and
- a transmission element located between the two pulley wheels and provided with two lateral surfaces facing each other which are in contact with the contact surfaces of the pulley wheels.

STATE OF THE ART

A continuously variable transmission system of this type is generally known in the form of a transmission in which the transmission element is formed by a push belt and where two pulley wheels are present of which one pulley wheel is located on the input shaft and the other pulley wheel on the output shaft.

SUMMARY OF THE INVENTION

It is an object of the invention to improve the known continuously variable transmission. It is more particularly an object of the invention to provide a continuously variable transmission that is more compact than the known continuously variable transmission. A further object of the invention is to provide a continuously variable transmission that has higher efficiency than the known continuously variable transmission. For this purpose the continuously variable transmission according to the invention is characterized in that:
- during operation the pulley is secured relative to the housing in the direction of rotation,
- the transmission element is formed by a ring that rolls down in the pulley on rotation of the input shaft,
- the continuously variable transmission furthermore includes a shaft journal connected to the input shaft on which journal the transmission element is bearing supported,
- the continuously variable transmission further includes a constant velocity joint of which a first joint portion is connected to the transmission element and of which a second joint portion is connected to the output shaft.

The observation that during operation the pulley is fixed relative to the housing in the direction of rotation is meant to be understood that the pulley can be turned in the direction of rotation while the transmission ratio is being adjusted/adapted, but is fixed in the direction of rotation during the transmission of power.

Characteristics which are of particular interest and importance for the continuously variable transmission according to the invention are:
1. The power to be transmitted passes only through the transmission element and the constant velocity joint;
2. The transmission element and the constant velocity joint have an efficiency approaching 100%, considerably bringing down the loss of the power to be transmitted;
3. The continuously variable transmission can be arranged such that geared neutral is possible, guaranteeing a large transmission range;
4. In a fixed arrangement a clearance-free transmission is possible while at the same time extremely large speed reductions are possible.

This construction may also be applied to the known continuously variable transmission. This offers the following advantages:
- 40% shorter fitting time;
- Less chance of a helical course of the transmission element which also leads to an improvement of efficiency.

An embodiment of the continuously variable transmission according to the invention is characterized in that the adjusting mechanism comprises a worm as well as an engaging annular worm wheel coupled to the pulley wheels, which pulley wheels are coupled to the housing, where a linear guide and a thread connection are present between the worm wheel and the pulley wheels and between the pulley wheels and the housing, so that by rotating the two threaded parts relative to each other the pulley wheels are moved away from each other or towards each other. As a result, adjustment can be effected electrically in lieu of hydraulically, which leads to energy saving and causes the construction to be simpler. The worm wheel may be provided with internal thread which is in engagement with the external thread present on the pulley wheels, where one of the pulley wheels is provided with right-hand thread and the other pulley wheel is provided with left-hand thread. In that case the linear guide is to be located between the pulley wheels and the housing. By rotating the worm wheel the pulley wheels are moving away from each other and towards each other without rotating themselves. Preferably, however, the linear guide is located between the worm wheel and the pulley wheels, for example in the form of a splined connection or gearing, and one of the pulley wheels is provided with right-hand and the other pulley wheel is provided with left-hand external thread and the housing is provided with internal thread. When the worm wheel is rotated, the pulley wheels will rotate along and be moved away from each other or towards each other.

Preferably, the shaft journal is located eccentrically relative to the input shaft. Furthermore, preferably the transmission element is bearing supported on an eccentric sleeve, which eccentric sleeve is mounted eccentrically to the shaft journal and is connected to the shaft journal via a torsion spring. This results in the fact that the transmission element is continuously pushed against the pulley wheels.

A further advantageous embodiment of the continuously variable transmission according to the invention is characterized in that the adjusting mechanism comprises an adjustable slide to which the shaft journal is fitted, as well as a linear guide in which the slide can be displaced and which is fitted perpendicular to the input shaft.

A still further advantageous embodiment of the continuously variable transmission according to the invention is characterized in that the continuously variable transmission further includes:
- at least a single further transmission element which is also located between the two pulley wheels, as well as at least a single further shaft journal on which the further transmission element is bearing supported and which is connected to the input shaft, at least a single further adjustable slide to which the further shaft journal is fitted, at least a single further linear guide in which the further slide can be displaced and which is fitted perpendicular to the input shaft, at least a single constant velocity joint which is connected with a first joint portion to the further transmission element and is connected with a second joint portion to the output shaft, an output gear which is connected to the output shaft, and at least two externally geared planet gears which are in meshing engagement with the output gear and are connected to the second joint portion and the further second joint portion of the constant velocity joints and are bearing supported in a carrier fitted to the input shaft.

This embodiment provides that a larger transmission range is obtained. The output gear may here be arranged as an internally geared annular gear or an externally geared sun gear.

Again a further embodiment of the continuously variable transmission according to the invention is characterized in that the contact surfaces of the pulley wheels are arranged such that they converge in a radial direction towards the outer circumference of the pulley wheels.

Preferably:
the first joint portion of the constant velocity joint can be displaced in axial direction relative to the transmission element, or
the second joint portion of the constant velocity joint can be displaced in axial direction relative to the output shaft, or
both of the joint portions of the constant velocity joint can be displaced in axial direction relative to each other.

Furthermore, preferably the second joint portion of the constant velocity joint can be displaced in axial direction relative to the output shaft via a further linear guide.

BRIEF DESCRIPTION OF THE DRAWINGS

The following description relating to the appended drawings, the whole given by way of non-limiting example of the continuously variable transmission according to the invention, will provide better understanding of how the invention can be realised, in which.

DETAILED DESCRIPTION OF THE DRAWINGS

Figure 1:
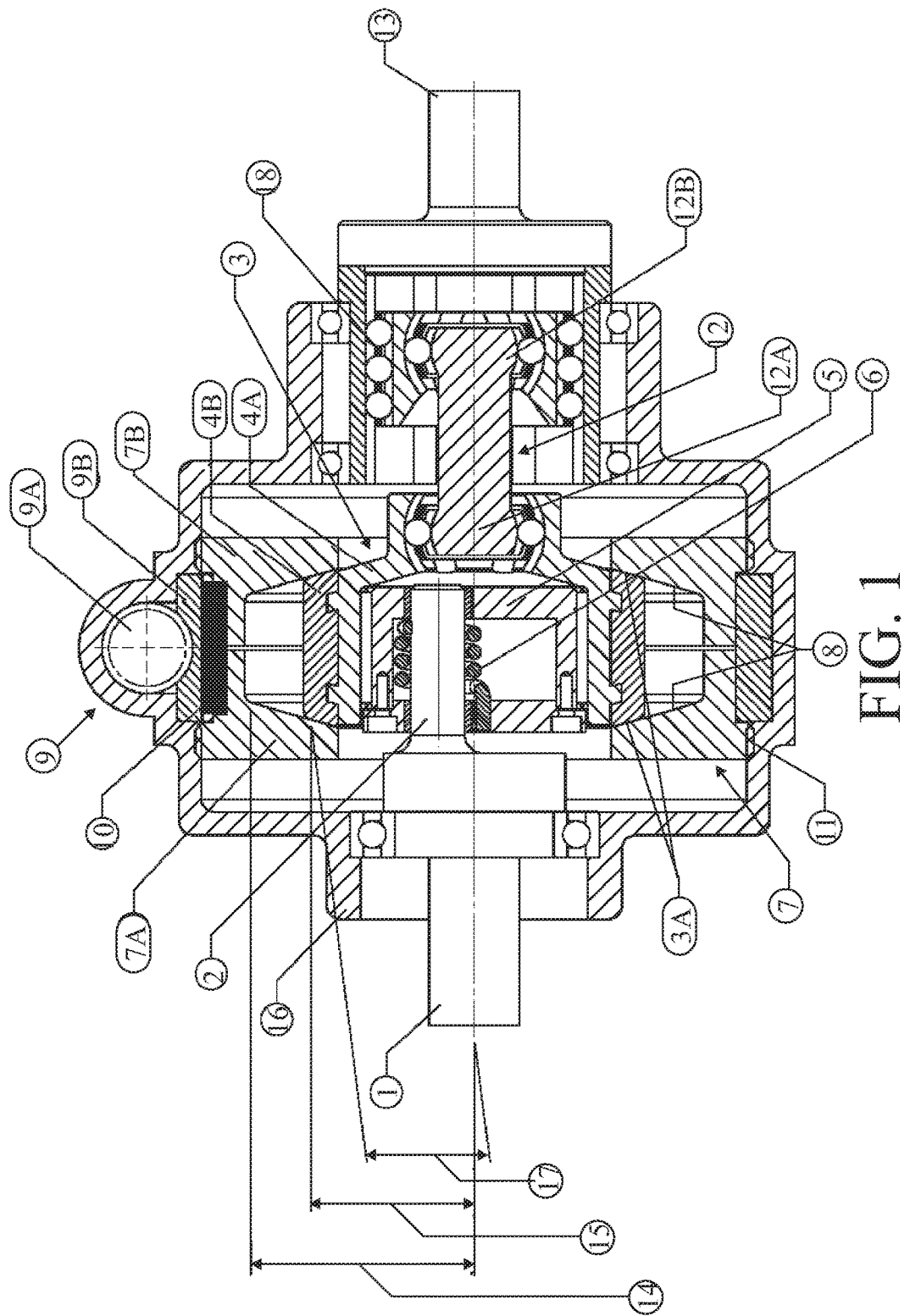
FIG. 1 shows a sectional view of a first embodiment of the continuously variable transmission according to the invention.

FIG. 1 shows a sectional view of a first embodiment of the continuously variable transmission according to the invention. The transmission has a housing 16 with a bearing supported input shaft 1 as well as an output shaft 13. Inside the housing a pulley 7 is present having two pulley wheels 7A and 7B spaced apart from each other and in axial direction movable towards each other and away from each other and provided with contact surfaces running obliquely relative to the central axis (axis of rotation of the pulley) and facing each other. The contact surfaces 8 of the pulley wheels converge in a radial direction towards the outer circumference of the pulley wheels. Between the pulley wheels is positioned an annular transmission element 3 which has two opposing lateral surfaces 3A which are in contact with the contact surfaces 8 of the pulley wheels. The transmission element 3 is formed by a partly annular carrier 4A carrying a plurality of contact elements 4B. These contact elements may be regarded as links in a circular push belt.

The transmission further includes an adjusting mechanism 9 for varying the distance between the two pulley wheels. The adjusting mechanism 9 comprises a worm 9A as well as an engaging annular worm wheel 9B. The pulley wheels 7A and 7B have left-hand and right-hand external thread which cooperates with internal thread 11 present in the housing 16. The pulley wheels 7A and 7B are connected to the worm wheel 9B by means of a spline 10. When the worm wheel 9B is rotated by the worm 9A, the pulley wheels 7A and 7B will move axially and the travel axis of the transmission element 3 will be determined by the axial distance between the pulley wheels. With a self-inhibiting adjusting mechanism the distance between the pulley wheels 7A and 7B will be retained when the worm 9A is stationary.

The transmission element 3 is bearing supported on an eccentric sleeve 5 which is located eccentrically relative to the shaft journal 2 eccentrically connected to the input shaft. The eccentric sleeve 5 can be rotated around the shaft journal 2 and is connected to the shaft journal via a pre-stressed torsion spring 6. This torsion spring exerts constant torque on the eccentric sleeve.

A constant velocity joint 12 is located between the transmission element 3 and the output shaft 13. A first joint portion 12A of this constant velocity joint 12 is connected to the transmission element 3 and a second joint portion 12B is connected to the output shaft 13. The second joint portion 12B of the constant velocity joint can be displaced via a linear guide 18 in axial direction relative to the output shaft 13.

The transmission ratio of the continuously variable transmission is:

$$\frac{\text{travel radius of the transmission element}}{\text{radius of the transmission element}} - 1$$

In FIG. 1 reference numerals 14 and 15 are used to indicate the maximum and minimum travel radius respectively of the transmission element and reference numeral 17 is used for indicating the radius of the transmission element 3.

Figure 2:
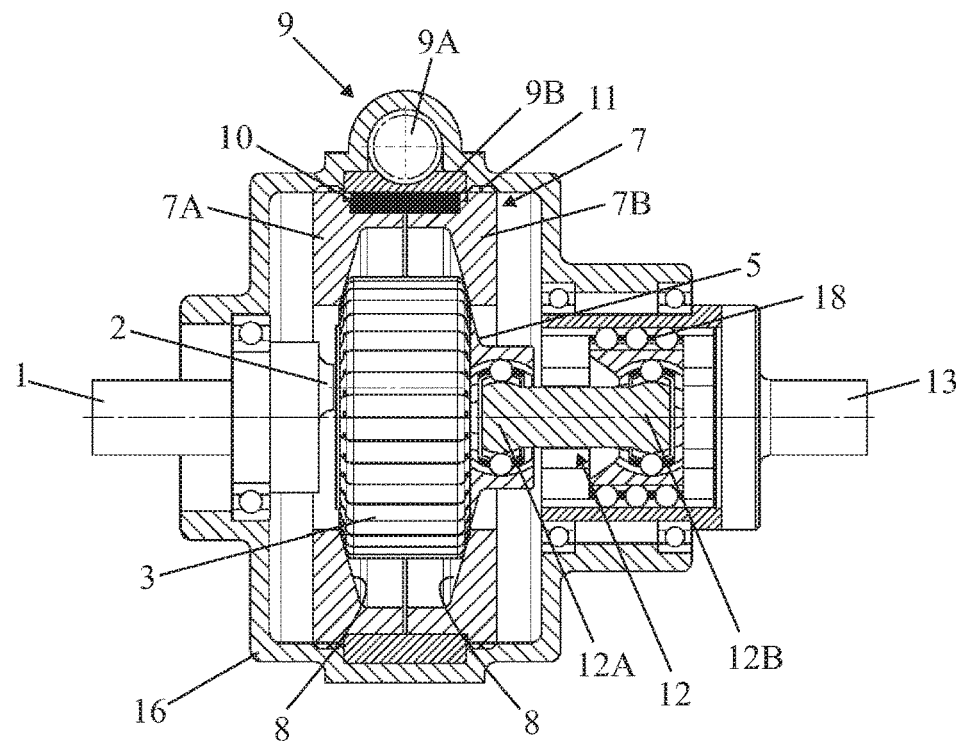
FIG. 2 shows the continuously variable transmission shown in FIG. 1 in the geared neutral position.
Figure 3:
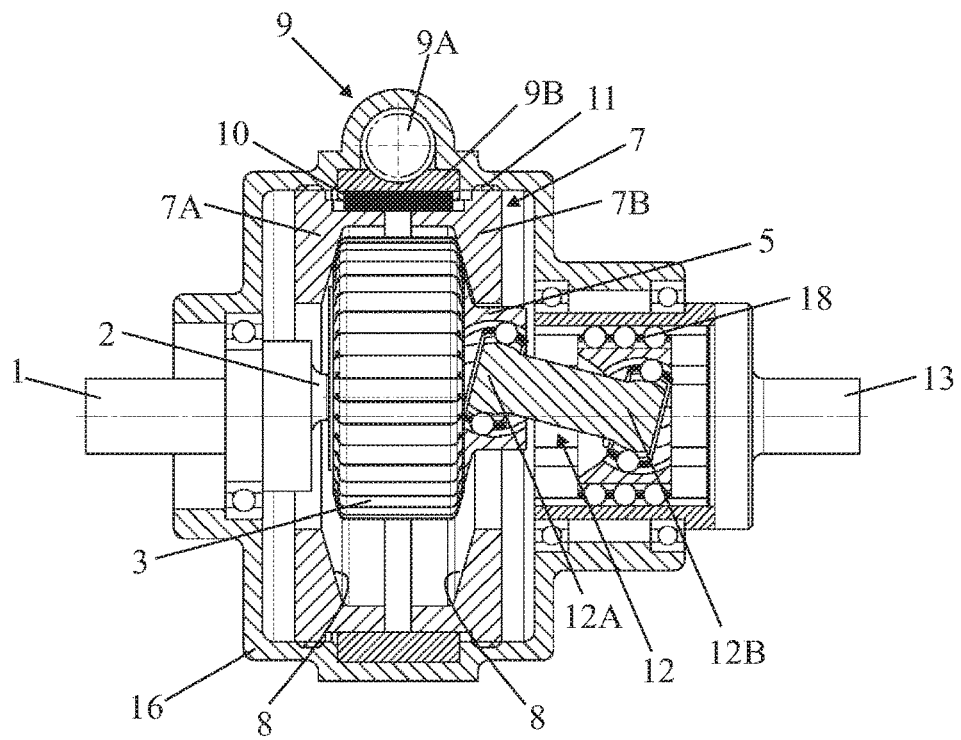
FIG. 3 shows the continuously variable transmission shown in FIG. 1 in the position giving the largest speed reduction.

In FIGS. 2 and 3 this continuously variable transmission is shown in the geared neutral position and the largest speed reduction position respectively. In the geared neutral position the travel radius of the transmission element equals the radius of the push belt while the output shaft 13 is stationary. In any other position there is an output speed.

Figure 4:
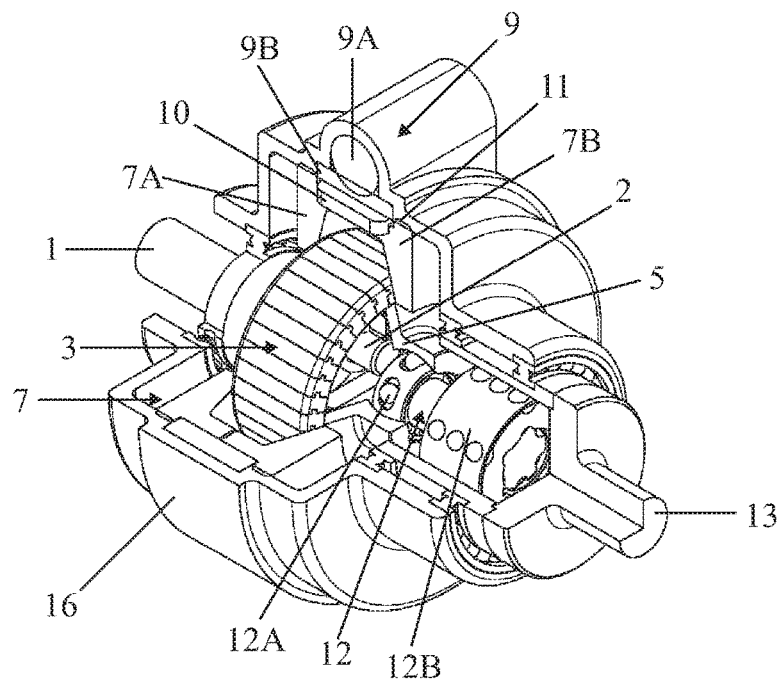
FIG. 4 gives a perspective view of the continuously variable transmission shown in FIG. 1 and with a partly cutaway housing.

By way of illustration this continuously variable transmission is shown in FIG. 4 in a perspective view with a partly cutaway housing.

Figure 5:
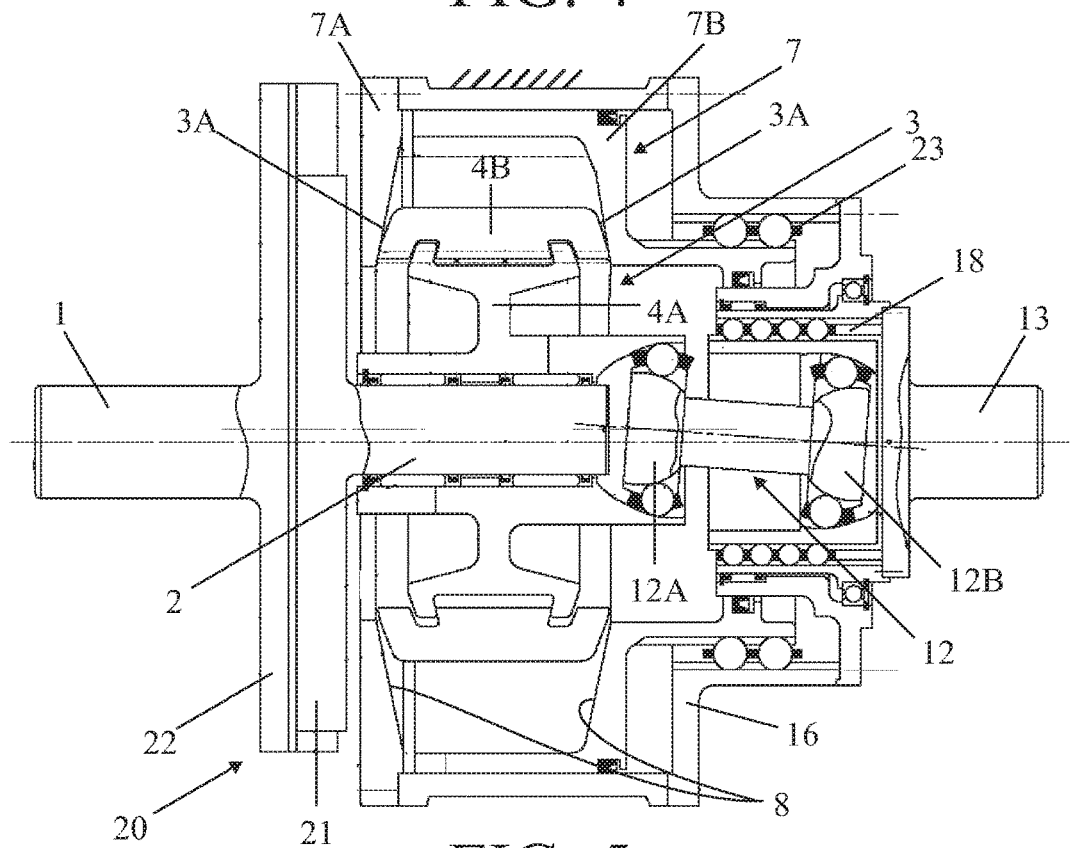
FIG. 5 sows a sectional view of a second embodiment of the continuously variable transmission according to the invention.

FIG. 5 shows a second embodiment of the continuously variable transmission according to the invention in the geared neutral position. All component parts that are similar or analogous to those of the first embodiment are referred to by like reference numerals. The adjusting mechanism 20 is formed here by an adjustable slide 21 to which the shaft journal 2 is mounted and which can be displaced in a linear guide 22 fitted perpendicular to the input shaft 1. From the two pulley wheels 7A and 7B one pulley wheel 7A is secured to the housing 16 while the other pulley wheel 7B can be displaced in axial direction in the housing by means of a linear guide 23.

By means of the adjusting mechanism 9, 20 the travel radius of the push belt can be varied. This may be effected by varying the distance between the pulley wheels (as is the case in the first embodiment) or by varying the eccentricity of the transmission element relative to the input shaft (as is the case in the second embodiment). In the first embodiment, the shaft journal 2, located eccentrically relative to the input shaft 1 and covered by the eccentric sleeve 5 with a continuous torque being exerted on the eccentric sleeve by a pre-stressed torsion spring 6 that intends to rotate the eccentric sleeve in a certain direction around the shaft journal, provides that the transmission element is continuously pushed against the pulley wheels. In the second embodiment a compression spring accommodated between the movable pulley wheel 7B and the housing 16 provides that the pulley wheels 7A and 7B are continuously pushed against the transmission element 3.

Figure 6:
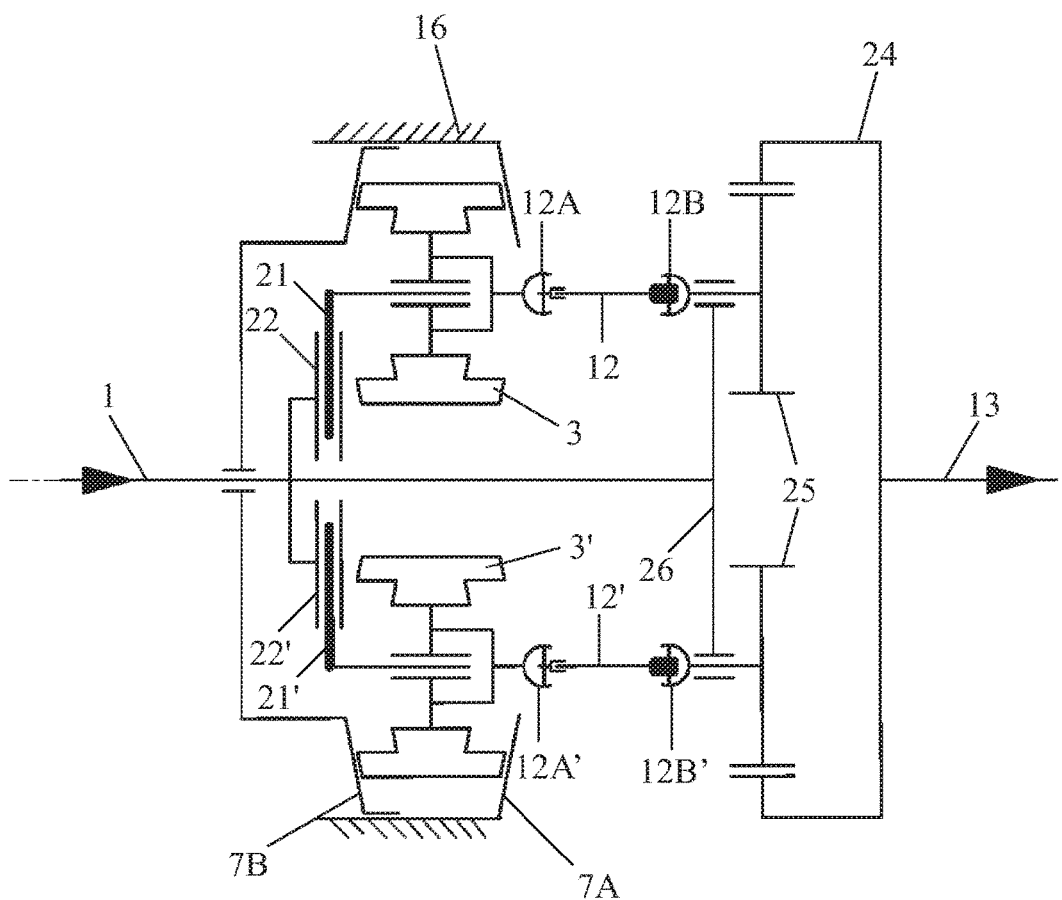
FIG. 6 gives a diagrammatic view of a third embodiment of the continuously variable transmission according to the invention.

In FIG. 6 is shown a third embodiment of the continuously variable transmission according to the invention in a diagrammatic manner. All component parts that are similar or analogous to those of the first embodiment are referred to by like reference numerals. This continuously variable transmission comprises two transmission elements 3 and 3' both of which are located between the pulley wheels 7A and 7B. Each of the transmission elements is bearing supported on a separate shaft journal 2 and 2'. The shaft journals are each fitted to a separate adjustable slide 21 and 21' which can be displaced in linear guides 22 and 22'.

The two transmission elements 3 and 3' are each connected to a first joint portion 12A and 12A' of a separate constant velocity joint 12 and 12'. The second joint portions 12B and 12B' of the constant velocity joints are each connected to a planet gear 25. These planet gears are bearing supported on a carrier 26 fitted to the input shaft 1 and are externally geared. The planet gears are in engagement with an output gear 24 fitted to the output shaft 13. This output gear is formed by an internally geared annular gear. In lieu of this, the output gear may also be formed by an externally geared sun gear.

Albeit the invention has been described in the foregoing with reference to the drawings, it should be pointed out that the invention is not by any manner or means restricted to the embodiments shown in the drawings. The invention also extends over any embodiments deviating from the embodiments shown in the drawing Figures within the scope defined by the claims.

The invention claimed is:

1. A continuously variable transmission comprising:
   a housing (16),
   an input shaft (1) bearing supported in the housing,
   an output shaft (13) bearing supported in the housing,
   a pulley (7) with two pulley wheels (7A, 7B) spaced apart from each other and provided with contact surfaces (8) running obliquely relative to the central axis and facing each other, of which pulley wheels at least one pulley wheel can be displaced in axial direction relative to the other pulley wheel,
   an adjusting mechanism for varying the travel radius of the push belt, and
   a transmission element (3) located between the two pulley wheels and provided with two lateral surfaces (3A) facing each other which are in contact with the contact surfaces (8) of the pulley wheels,
   wherein
   during operation the pulley (7) is secured relative to the housing (16) in the direction of rotation,
   the transmission element (3) is formed by a ring that rolls down in the pulley (7) on rotation of the input shaft (1),
   the continuously variable transmission furthermore includes a shaft journal (2) connected to the input shaft on which journal the transmission element (3) is bearing supported,
   the continuously variable transmission further includes a constant velocity joint (12) of which a first joint portion (12A) is connected to the transmission element (3) and of which a second joint portion (12B) is connected to the output shaft (13).

2. A continuously variable transmission as claimed in claim 1, wherein the adjusting mechanism comprises a worm (9A) as well as an engaging annular worm wheel (9B) coupled to the pulley wheels (7A, 7B), which pulley wheels are coupled to the housing (16), where a linear guide and a thread connection are present between the worm wheel and the pulley wheels and between the pulley wheels and the housing, so that by rotating the two threaded parts relative to each other the pulley wheels are moved away from each other or towards each other.

3. A continuously variable transmission as claimed in claim 2, wherein the shaft journal (2) is located eccentrically relative to the input shaft (1).

4. A continuously variable transmission as claimed in claim 3, wherein the transmission element (3) is bearing supported on an eccentric sleeve (5), which eccentric sleeve is mounted eccentrically to the shaft journal (2) and is connected to the shaft journal (2) via a torsion spring (6).

5. A continuously variable transmission as claimed in claim 1, wherein the adjusting mechanism (20) comprises an adjustable slide (21) to which the shaft journal (2) is fitted, as well as a linear guide (22) in which the slide can be displaced and which is fitted perpendicular to the input shaft (1).

6. A continuously variable transmission as claimed in claim 5, wherein the continuously variable transmission further includes:
   at least a single further transmission element (3') which is also located between the two pulley wheels (7A, 7B), as well as
   at least a single further shaft journal (2') on which the further transmission element (3') is bearing supported and which is connected to the input shaft (1),
   at least a single further adjustable slide (21') to which the further shaft journal (2') is fitted,
   at least a single further linear guide (22') in which the further slide can be displaced and which is fitted perpendicular to the input shaft (1),
   at least a single constant velocity joint (12') which is connected with a first joint portion (12A') to the further transmission element (3') and is connected with a second joint portion (12B') to the output shaft (13), an output gear (24) which is connected to the output shaft, and at least two externally geared planet gears (25) which are in meshing engagement with the output gear and are connected to the second joint portion (12B) and the further second joint portion (12B') of the constant velocity joints and are bearing supported in a carrier (26) fitted to the input shaft (1).

7. A continuously variable transmission as claimed in claim 1, wherein the contact surfaces of the pulley wheels (7A, 7B) are arranged such that they converge in a radial direction towards the outer circumference of the pulley wheels (7A, 7B).

8. A continuously variable transmission as claimed in claim 1, wherein:
the first joint portion (12A) of the constant velocity joint (12) can be displaced in axial direction relative to the transmission element (3), or
the second joint portion (12B) of the constant velocity joint (12) can be displaced in axial direction relative to the output shaft (13), or
both of the joint portions of the constant velocity joint (12) can be displaced in axial direction relative to each other.

9. A continuously variable transmission as claimed in claim 8, wherein the second joint portion of the constant velocity joint (12) can be displaced in radial direction relative to the output shaft (13) via a further linear guide (18).

10. A continuously variable transmission as claimed in claim 2, wherein the adjusting mechanism (20) comprises an adjustable slide (21) to which the shaft journal (2) is fitted, as well as a linear guide (22) in which the slide can be displaced and which is fitted perpendicular to the input shaft (1).

11. A continuously variable transmission as claimed in claim 2, wherein the contact surfaces of the pulley wheels (7A, 7B) are arranged such that they converge in a radial direction towards the outer circumference of the pulley wheels (7A, 7B).

12. A continuously variable transmission as claimed in claim 3, wherein the contact surfaces of the pulley wheels (7A, 7B) are arranged such that they converge in a radial direction towards the outer circumference of the pulley wheels (7A, 7B).

13. A continuously variable transmission as claimed in claim 4, wherein the contact surfaces of the pulley wheels (7A, 7B) are arranged such that they converge in a radial direction towards the outer circumference of the pulley wheels (7A, 7B).

14. A continuously variable transmission as claimed in claim 5, wherein the contact surfaces of the pulley wheels (7A, 7B) are arranged such that they converge in a radial direction towards the outer circumference of the pulley wheels (7A, 7B).

15. A continuously variable transmission as claimed in claim 6, wherein the contact surfaces of the pulley wheels (7A, 7B) are arranged such that they converge in a radial direction towards the outer circumference of the pulley wheels (7A, 7B).

16. A continuously variable transmission as claimed in claim 2, wherein:
the first joint portion (12A) of the constant velocity joint (12) can be displaced in axial direction relative to the transmission element (3), or
the second joint portion (12B) of the constant velocity joint (12) can be displaced in axial direction relative to the output shaft (13), or
both of the joint portions of the constant velocity joint (12) can be displaced in axial direction relative to each other.

17. A continuously variable transmission as claimed in claim 3, wherein:
the first joint portion (12A) of the constant velocity joint (12) can be displaced in axial direction relative to the transmission element (3), or
the second joint portion (12B) of the constant velocity joint (12) can be displaced in axial direction relative to the output shaft (13), or
both of the joint portions of the constant velocity joint (12) can be displaced in axial direction relative to each other.

18. A continuously variable transmission as claimed in claim 4, wherein:
the first joint portion (12A) of the constant velocity joint (12) can be displaced in axial direction relative to the transmission element (3), or
the second joint portion (12B) of the constant velocity joint (12) can be displaced in axial direction relative to the output shaft (13), or
both of the joint portions of the constant velocity joint (12) can be displaced in axial direction relative to each other.

19. A continuously variable transmission as claimed in claim 5, wherein:
the first joint portion (12A) of the constant velocity joint (12) can be displaced in axial direction relative to the transmission element (3), or
the second joint portion (12B) of the constant velocity joint (12) can be displaced in axial direction relative to the output shaft (13), or
both of the joint portions of the constant velocity joint (12) can be displaced in axial direction relative to each other.

20. A continuously variable transmission as claimed in claim 6, wherein:
the first joint portion (12A) of the constant velocity joint (12) can be displaced in axial direction relative to the transmission element (3), or
the second joint portion (12B) of the constant velocity joint (12) can be displaced in axial direction relative to the output shaft (13), or
both of the joint portions of the constant velocity joint (12) can be displaced in axial direction relative to each other.

* * * * *